United States Patent
Mullen et al.

(10) Patent No.: US 10,913,419 B2
(45) Date of Patent: Feb. 9, 2021

(54) VEHICLE FOOT PEDAL STOWAGE AND CONCEALMENT SYSTEM

(71) Applicant: Ford Global Technologies, LLC, Dearborn, MI (US)

(72) Inventors: Gary D. Mullen, Plymouth, MI (US); John A. Shinska, Dearborn, MI (US); Gregory Pfirman, Dearborn, MI (US); Keith Brown, Riverview, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 16/445,567

(22) Filed: Jun. 19, 2019

(65) Prior Publication Data

US 2020/0398725 A1    Dec. 24, 2020

(51) Int. Cl.
| | |
|---|---|
| *B60R 21/09* | (2006.01) |
| *B60N 3/04* | (2006.01) |
| *B60K 26/02* | (2006.01) |
| *B60T 7/06* | (2006.01) |
| *B62D 25/20* | (2006.01) |
| *G05D 1/00* | (2006.01) |

(52) U.S. Cl.
CPC .............. *B60R 21/09* (2013.01); *B60K 26/02* (2013.01); *B60N 3/044* (2013.01); *B60T 7/06* (2013.01); *B62D 25/20* (2013.01); *B60K 2026/026* (2013.01); *G05D 1/00* (2013.01)

(58) Field of Classification Search
CPC ..................................................... B60R 21/09
See application file for complete search history.

(56) References Cited

U.S. PATENT DOCUMENTS

| | | | | |
|---|---|---|---|---|
| 6,179,079 | B1* | 1/2001 | Basnett | B60N 3/066 180/90.6 |
| 6,329,724 | B1* | 12/2001 | Shaklik | B60R 21/045 307/10.1 |
| 9,010,472 | B2 | 4/2015 | Meszaros et al. | |
| 9,073,574 | B2 | 7/2015 | Cuddihy et al. | |
| 9,963,035 | B2 | 5/2018 | El Aile et al. | |
| 2003/0084744 | A1* | 5/2003 | Parenteau | G05G 1/405 74/512 |
| 2010/0230990 | A1* | 9/2010 | Shukuri | B60N 3/066 296/75 |
| 2014/0210227 | A1 | 7/2014 | Meszaros et al. | |

(Continued)

FOREIGN PATENT DOCUMENTS

| | | |
|---|---|---|
| DE | 102018206274 B3 | 6/2019 |
| KR | 970039985 | 7/1997 |

(Continued)

*Primary Examiner* — Drew J Brown
(74) *Attorney, Agent, or Firm* — David Coppiellie; Price Heneveld LLP

(57) ABSTRACT

A footwell assembly for a vehicle is disposed herein. The footwell assembly includes at least one foot pedal disposed in the footwell and operable between a use position and a stowed position. A receiving member is positioned within the footwell and is defining a recess, wherein the at least one foot pedal is configured to nest within the recess while in the stowed position. A cover feature is operably coupled to the receiving member and is configured to cover the at least one foot pedal when the at least one foot pedal is nested within the recess of the receiving member in the stowed position.

20 Claims, 8 Drawing Sheets

(56) References Cited

U.S. PATENT DOCUMENTS

| | | | | |
|---|---|---|---|---|
| 2014/0265509 A1* | 9/2014 | Meszaros | ............... | B60T 7/045 |
| | | | | 297/423.1 |
| 2020/0047816 A1* | 2/2020 | Tanaka | .................. | B62D 25/20 |
| 2020/0317152 A1* | 10/2020 | Ghaffari | ................. | B60R 21/09 |

FOREIGN PATENT DOCUMENTS

| KR | 20170000013 A | 1/2017 |
|---|---|---|
| KR | 20170137427 A | 12/2017 |

\* cited by examiner

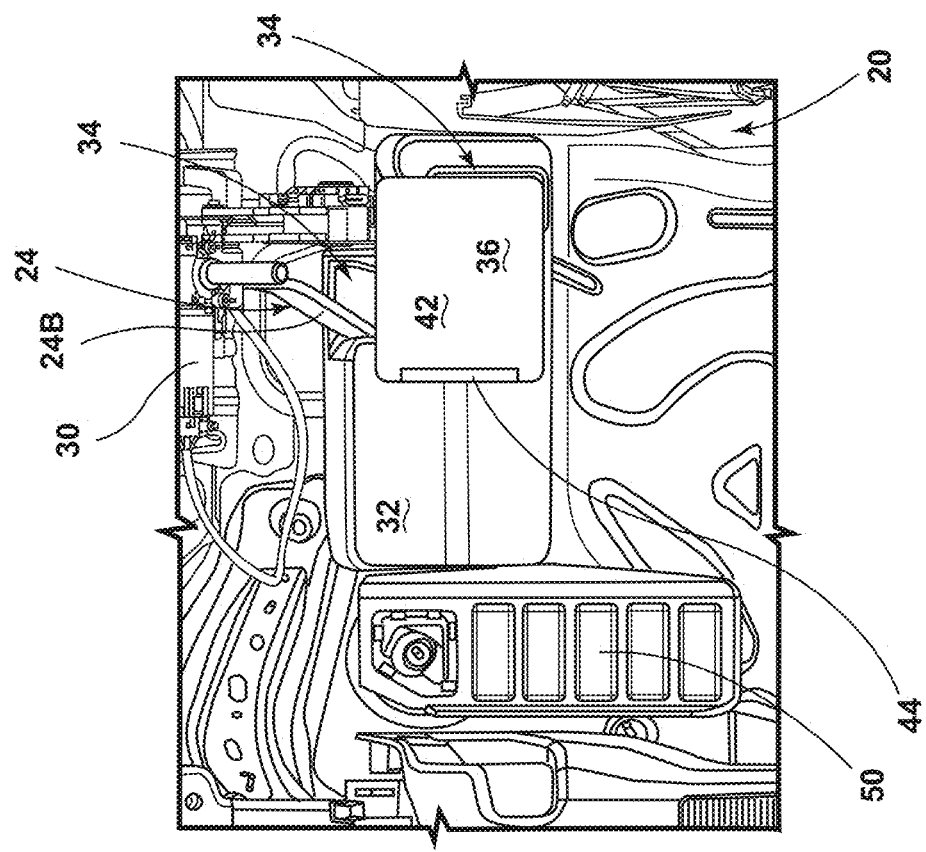
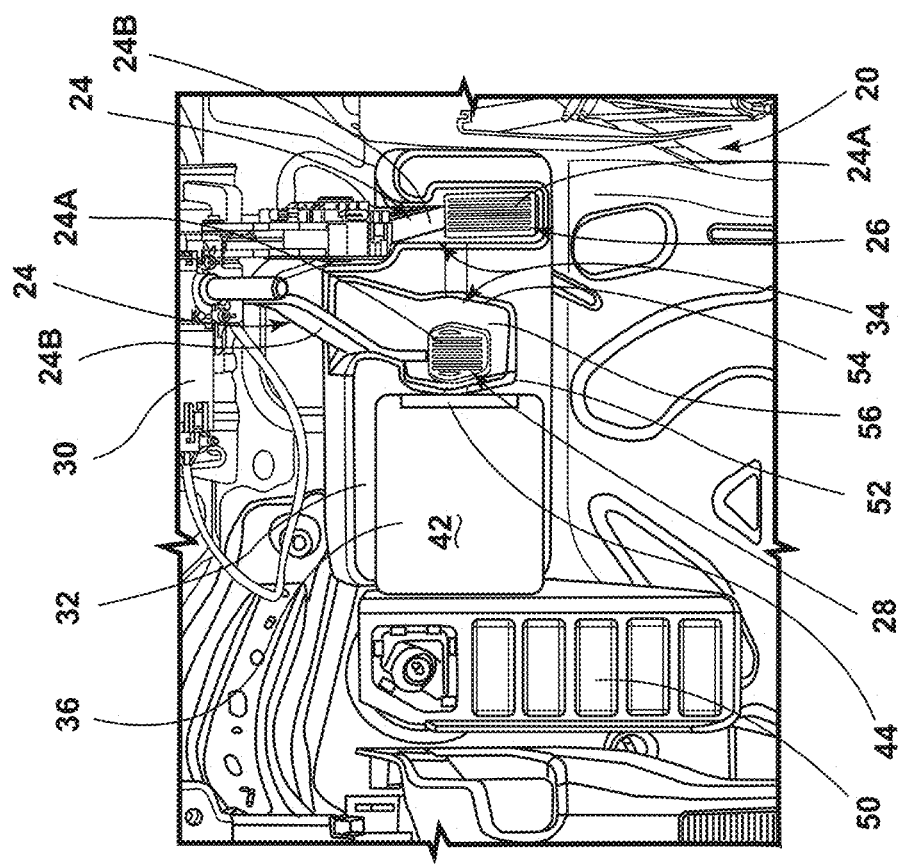
FIG. 6A
FIG. 6B

VEHICLE FOOT PEDAL STOWAGE AND CONCEALMENT SYSTEM

FIELD OF THE INVENTION

The present invention generally relates to a footwell assembly for a vehicle. In particular, the present invention relates to a footwell assembly for concealing stowable foot pedals.

BACKGROUND OF THE INVENTION

Vehicles often includes foot pedals. Autonomous vehicles may only need foot pedals in certain circumstances. Accordingly, the ability to stow foot pedals within the footwell of an autonomous vehicle may be convenient, as deactivated foot pedals may take up space unnecessarily. Further, covering stowed foot pedals with a cover feature may be desirable, as doing so may be aesthetically pleasing and may reduce confusion.

SUMMARY OF THE INVENTION

According to one aspect of the present invention, a footwell assembly for a vehicle is disclosed. At least one foot pedal is disposed in the footwell and is operable between a use position and a stowed position. A receiving member is positioned within the footwell and defines a recess. The at least one foot pedal is configured to nest within the recess while in the stowed position. A cover feature is positioned within the footwell and is configured to cover the at least one foot pedal when the at least one foot pedal is nested within the recess of the receiving member in the stowed position.

Embodiments of the first aspect of the invention can include any one or a combination of the following features:
 the cover feature comprises a floor mat disposed in the footwell and configured to extend to cover the at least one foot pedal in the stowed position;
 the cover feature comprises a plurality of finger features coupled to the receiving member proximate to the recess and configured to yieldingly allow the at least one foot pedal to ingress and egress the recess as the at least one foot pedal moves between the use and stowed positions;
 the cover feature comprises a panel feature disposed within the footwell and operable between a first position and a second concealment position, wherein the panel feature is configured to cover the at least one foot pedal in the stowed position;
 the panel feature is coupled to the receiving member and configured to pivot from the first position to the second concealment position;
 the panel feature comprises a living hinge about which the panel feature is configured to pivot;
 the at least one foot pedal comprises an accelerator pedal;
 the cover feature is operably coupled to the receiving member;
 the at least one foot pedal is deactivated while in the stowed position; and
 the cover feature is configured to cover the at least one foot pedal by moving from a first position to a second concealment position, wherein the cover feature is coupled to the receiving member and extends across at least a portion of the recess while the at least one foot pedal is in the stowed position.

According to another aspect of the present invention, a system for stowing foot pedals in a footwell of a vehicle is disclosed. At least one foot pedal is disposed in the footwell of the vehicle and is operable between a use position and a stowed position vehicle forward of the use position. A receiving member is disposed vehicle forward of the at least one foot pedal. A cover feature is operable to enter a concealment position when the at least one foot pedal is in the stowed position, wherein the cover feature is coupled to the receiving member, the at least one foot pedal is disposed between the receiving member and the cover feature, and the cover feature is positioned vehicle rearward of the at least one foot pedal.

Embodiments of the second aspect of the invention can include any one or a combination of the following features:
 the at least one foot pedal comprises an accelerator pedal;
 the at least one foot pedal further comprises a brake pedal;
 the accelerator pedal is deactivated while in the stowed position; and
 the receiving member defines a recess configured to receive the at least one foot pedal as the at least one foot pedal moves from the use position to the stowed position.

According to a further aspect of the present invention, a vehicle is disclosed. The vehicle includes a footwell. An accelerator pedal is positioned within the footwell and is operable between a use position and a stowed position. A receiving member is positioned within the footwell and defines a recess configured to receive the accelerator pedal when the accelerator pedal is in the stowed position. A cover feature coupled to the receiving member is configured to cover the accelerator pedal when the accelerator pedal is in the stowed position and within the recess defined by the receiving member, wherein the cover feature is positioned between the stowed position and the use position of the accelerator pedal.

Embodiments of the third aspect of the invention can include any one or a combination of the following features:
 the accelerator pedal is deactivated while in the stowed position;
 the use position of the accelerator pedal is vehicle rearward of the stowed position;
 the receiving member is positioned vehicle forward of the accelerator pedal when the accelerator pedal is in the use position and when the accelerator pedal is in the stowed position; and
 a motor operable to move the accelerator pedal between the use position and the stowed position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6A is a frontal view of the footwell, illustrating the foot pedals in the stowed position and the cover feature in the form of a panel coupled to the receiving member via a living hinge in a first position, according to a further embodiment;

FIG. 6B is a frontal view of the footwell, illustrating the foot pedals in the stowed position and the cover feature in the form of the panel coupled to the receiving member via the living hinge in a second concealment position;

DETAILED DESCRIPTION OF THE PREFERRED EMBODIMENTS

Figure 1:
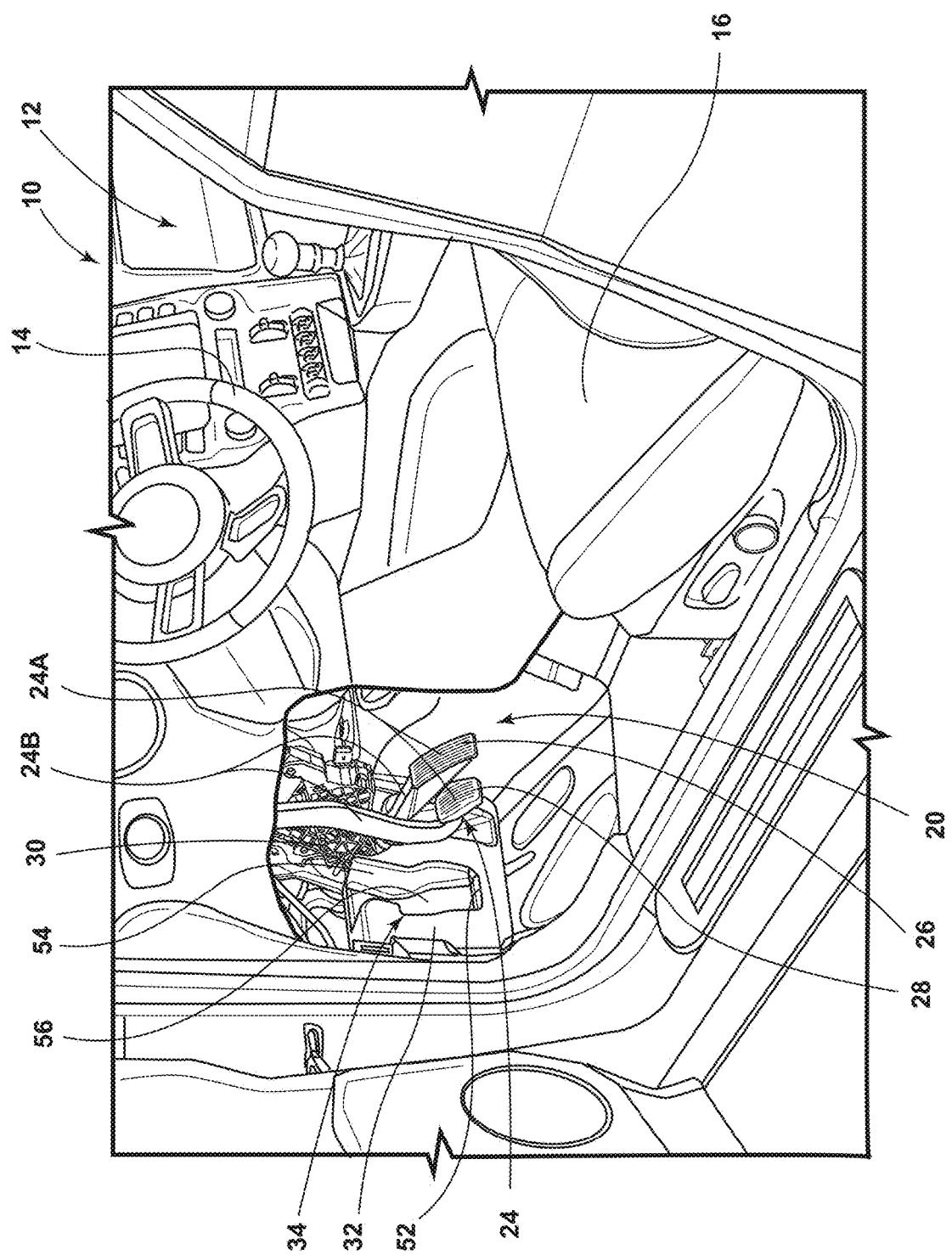
FIG. 1 is a perspective view of a vehicle footwell, illustrating foot pedals in a use position, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-8, a footwell assembly for a vehicle 10 is disclosed. At least one foot pedal 24 is disposed in the footwell 20 and is operable between a use position and a stowed position. A receiving member 32 is positioned within the footwell 20 and defines a recess 34, wherein the at least one foot pedal 24 is configured to nest within the recess 34 while in the stowed position. A cover feature 36 is operably coupled to the receiving member 32 and is configured to cover the at least one foot pedal 24 when the at least one foot pedal 24 is nested within the recess 34 of the receiving member 32 in the stowed position.

Referring now to FIG. 1, the vehicle 10 may be a passenger motor vehicle that includes a vehicle interior 12 that defines a passenger compartment. The vehicle interior 12 may include a steering wheel 14. The vehicle interior 12 may further include a seating assembly 16. The seating assembly 16 may correspond to the position of the steering wheel 14 within the vehicle 10 such that the seating assembly 16 would be recognized as a driver's seat. The vehicle interior 12 may further include the footwell 20. The footwell 20 may be defined by a portion of the vehicle interior 12. In various embodiments, the footwell 20 may be the area in front of the seating assembly 16 that corresponds to the steering wheel 14 in which a seated vehicle occupant would place his or her feet. The footwell 20 may bounded by various vehicle interior components (e.g., floor, dashboard, dead pedal 50, etc.). In some embodiments, the seating assembly 16 that corresponds with the steering wheel 14 may delineate the vehicle rearward boundary of the footwell 20.

In further reference to FIG. 1, at least one foot pedal 24 may be positioned within the footwell 20. In various embodiments, the at least one foot pedal 24 may include an accelerator pedal 26 and/or a brake pedal 28. In some embodiments, the at least one foot pedal 24 may include various vehicle pedals instead of or in addition to the accelerator pedal 26 and/or the brake pedal 28 (e.g., clutch pedal, parking brake pedal, etc.). In various embodiments, the at least one foot pedal 24 may be configured to be depressed by the foot of the vehicle occupant to perform a vehicle function such as an acceleration input or braking input, as is customary in vehicles. In some embodiments, the at least one foot pedal 24 may be a suspended pedal, as shown in FIG. 1. It is contemplated that the at least one foot pedal 24 may be at least one of a variety of foot pedal styles (e.g., organ-type, bottom hinged, etc.). It is further contemplated that the at least one foot pedal 24 may include multiple pedals having similar or different pedal styles.

As shown in FIG. 1, the at least one foot pedal 24 may include a pad 24A configured to be engaged by the foot of the vehicle occupant depressing the at least one foot pedal 24. In various embodiments, the accelerator pedal 26 and/or the brake pedal 28 may include the pad 24A. As further depicted in FIG. 1, the at least one foot pedal 24 may include a lever feature 24B. The lever feature 24B may be coupled to the pad 24A and may be configured to move in response to the at least one foot pedal 24 being depressed. In various embodiments, the lever feature 24B may be configured to pivot as the at least one foot pedal 24 is depressed by the vehicle occupant. As shown in FIG. 1, the lever feature 24B may be configured to extend generally vehicle upward from the pad 24A. In some embodiments, however, the lever feature 24B may extend in various vehicle directions relative to the pad 24A. For example, in some embodiments, in which the at least one foot pedal 24 is a bottom hinged style pedal, the lever feature 24B may extend vehicle downward from the pad 24A. In various embodiments, the lever feature 24B may be coupled to a surface of the pad 24A opposite of the surface of the pad 24A that is configured to be engaged by the foot of the vehicle occupant.

Referring now to FIGS. 2A-3B, the at least one foot pedal 24 may be operable between a use position and a stowed position. In various embodiments, the location of the at least one foot pedal 24 while in the stowed position may be vehicle forward of the location of the at least one foot pedal 24 while in the use position. It is contemplated that in some embodiments, the location of the at least one foot pedal 24 while in the stowed position may be various vehicle directions relative to the location of the at least one foot pedal 24 while in the use position (e.g., vehicle upward, vehicle downward, vehicle rearward, laterally displaced, etc.). The at least one foot pedal 24 may be depressed by the vehicle occupant in the use position, as is customary in wheeled motor vehicles.

Figure 3A:
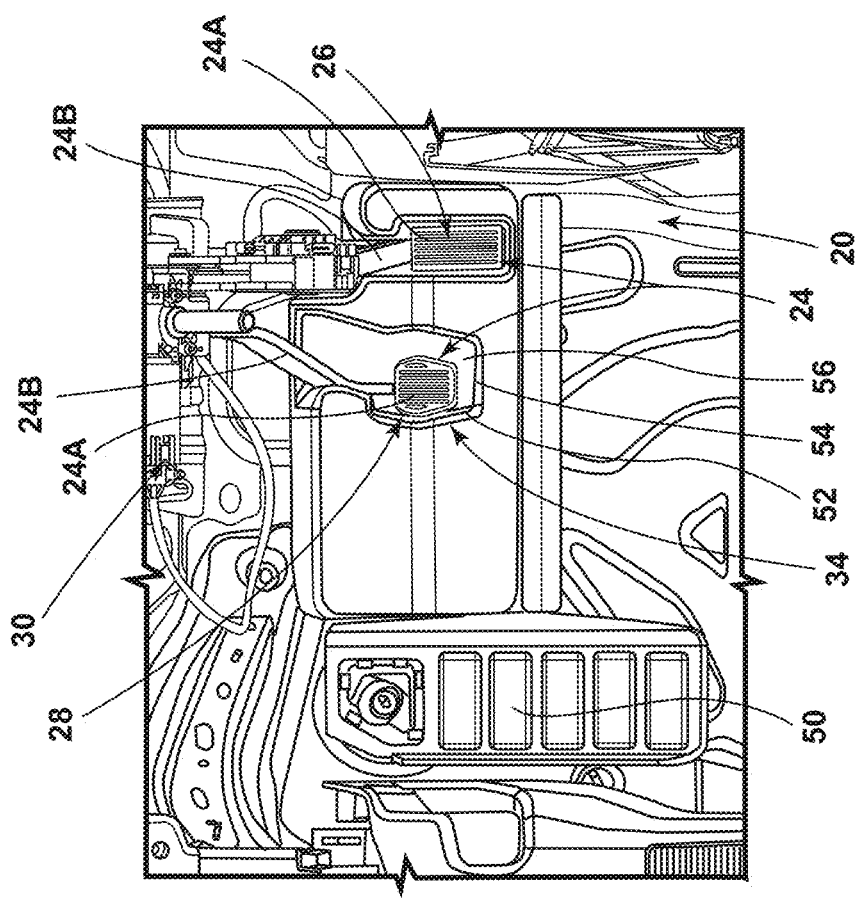
FIG. 3A is a perspective view of the footwell, illustrating the foot pedals in a stowed position and the cover feature in the first position, according to one embodiment.
Figure 3B:
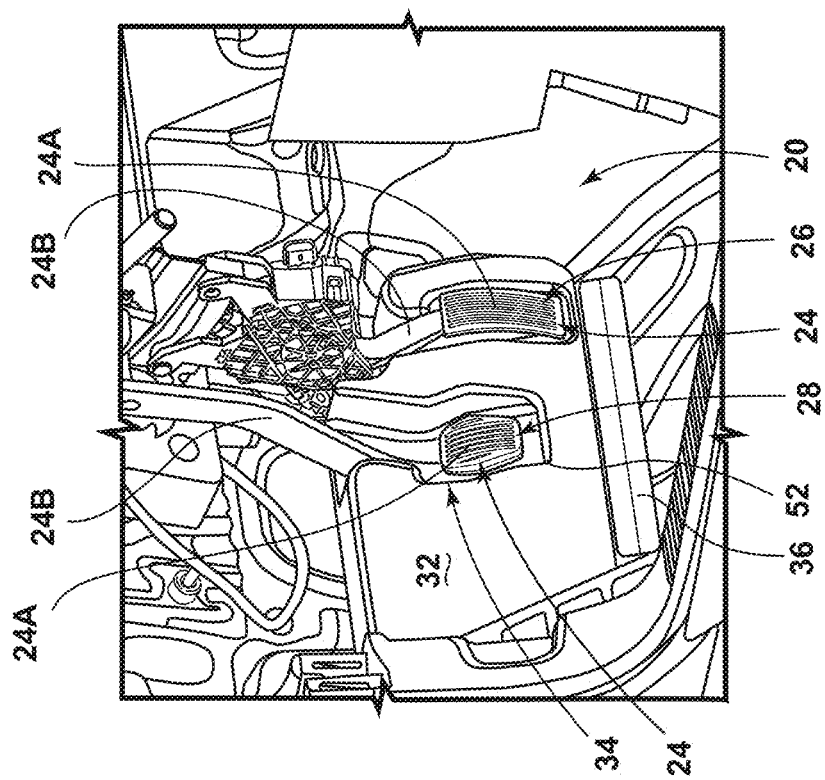
FIG. 3B is a frontal view of the footwell, illustrating the foot pedals in the stowed position and the cover feature in the first position.

As shown in FIG. 3B, in various embodiments, a motor 30 may be operably coupled to the at least one foot pedal 24 and may be configured to move the at least one foot pedal 24 between the use and stowed positions. In some embodiments, the motor 30 may be coupled to the lever feature 24B. It is contemplated that the motor 30 may be at least one of a variety of different motor types (e.g., AC brushless, DC brushed, DC brushless, direct drive, linear, servo, stepper, etc.). It is further contemplated that the motor 30 may be coupled to a controller 60 configured to control operation of the motor 30.

In some embodiments, the at least one foot pedal 24 may be operable between an activated mode and a deactivated mode. The at least one foot pedal 24 may be configured to control action of the vehicle 10 while in the activated mode. For example, in some embodiments, wherein the at least one foot pedal 24 includes the accelerator pedal 26 and the brake pedal 28, the accelerator pedal 26 may be configured to prompt acceleration of the vehicle 10 upon being depressed by the vehicle occupant, and the brake pedal 28 may be configured to prompt application of the brakes of the vehicle 10 upon engagement by the vehicle occupant, while the at least one foot pedal 24 is in the activated mode.

In some embodiments, the at least one foot pedal 24 may be configured to not control action of the vehicle 10 while in the deactivated mode. In other words, while in the deactivated mode, the at least one foot pedal 24 may be depressible by the vehicle occupant while the vehicle 10 is in operation (i.e., in gear and moving) and yet not influence acceleration, braking, and/or other actions of the vehicle 10. For instance, in an exemplary embodiment, the at least one foot pedal 24 may be in the deactivated mode while the vehicle 10 is driving autonomously (in autonomous mode), and engagement of the at least one foot pedal 24 may not influence the actions of the moving vehicle 10.

In some embodiments, the mode of the at least one foot pedal 24 (activated versus deactivated) may correspond to the position of the at least one foot pedal 24 (use position versus stowed position). For example, the at least one foot pedal 24 in the activated mode may correspond to the at least one foot pedal 24 in the use position. Further, in some embodiments, the at least one foot pedal 24 in the deactivated mode may correspond to the at least one foot pedal 24 in the stowed position. In some embodiments, the at least one foot pedal 24 may enter the deactivated mode in response to being positioned in the stowed position. In some embodiments, the at least one foot pedal 24 may be positioned in the stowed position in response to entering the deactivated mode. In various embodiments, movement of the at least one foot pedal 24 from the use position to the stowed position may prompt the at least one foot pedal 24 to enter the deactivated mode. Further, it is contemplated that in some embodiments, the at least one foot pedal 24 may be configured not to remain in or enter the activated mode while in the stowed position. It is further contemplated that the controller 60 may control what mode the at least one foot pedal 24 is in based on a variety of factors.

Referring now to FIGS. 1-3B, the footwell 20 may include the receiving member 32. In various embodiments, the receiving member 32 may be positioned proximate to the vehicle forward end of the footwell 20. In some embodiments, the receiving member 32 may be positioned vehicle forward of the at least one foot pedal 24. For example, in some embodiments, the receiving member 32 may be positioned vehicle forward of the accelerator pedal 26 when the accelerator pedal 26 is in the use position and when the accelerator pedal 26 is in the stowed position. It is contemplated that in some embodiments, the receiving member 32 may be positioned in various vehicle directions within the footwell 20 relative to the at least one foot pedal 24.

Figure 2B:
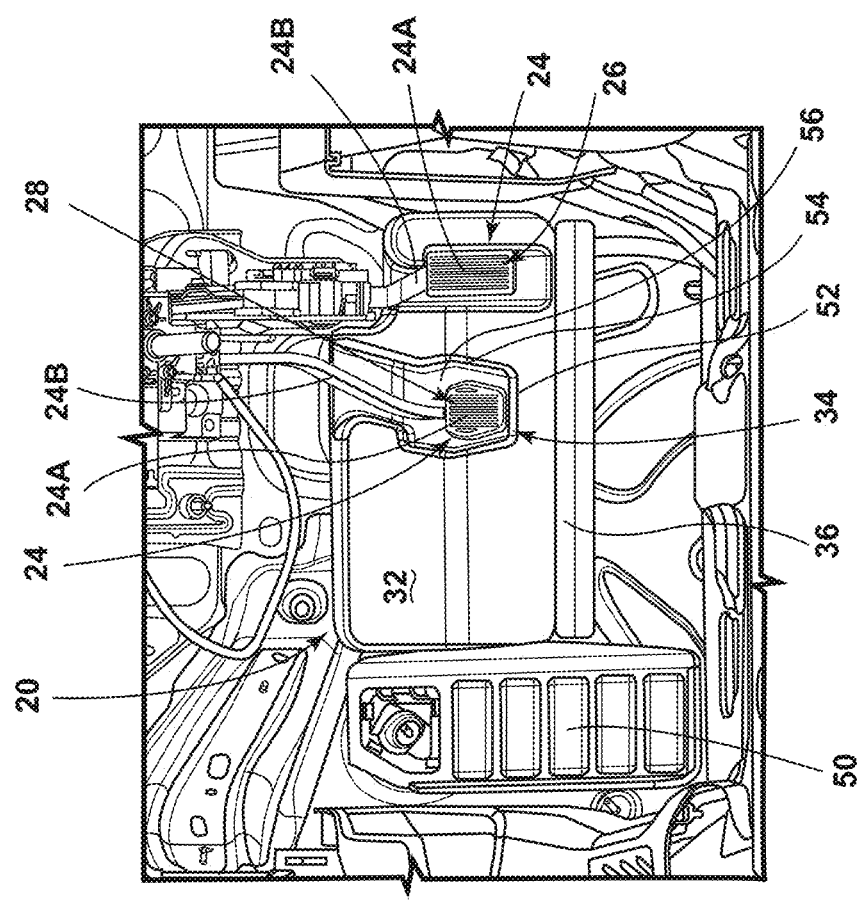
FIG. 2B is a frontal view of the foot pedals in the use position within the footwell, illustrating the cover feature in the first position.
Figure 2A:
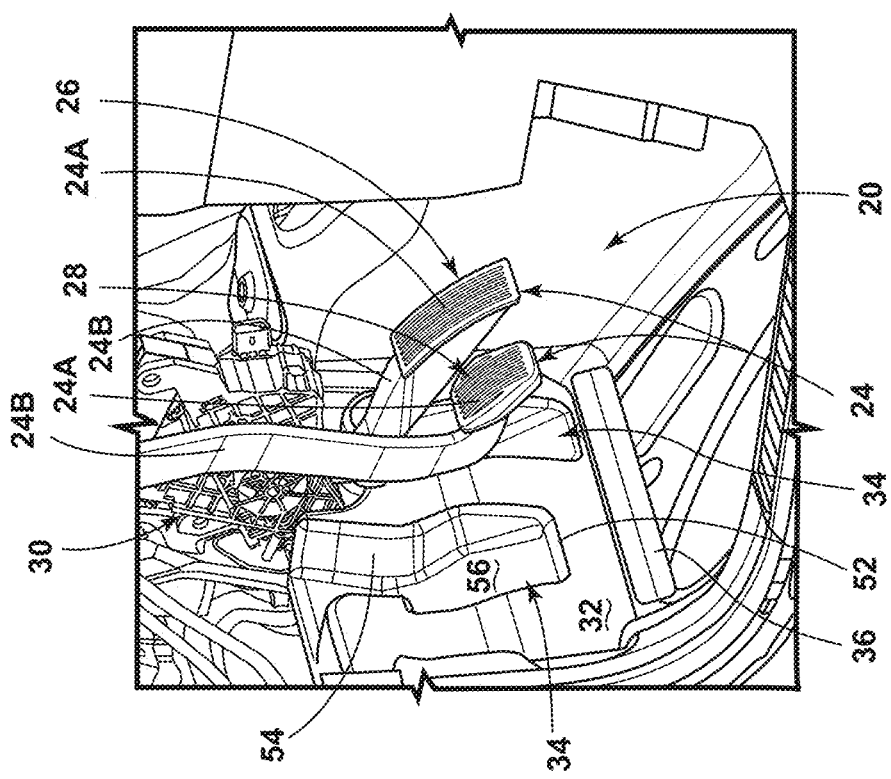
FIG. 2A is a perspective view of the foot pedals within the footwell, illustrating a cover feature in a first position.

In various embodiments, the receiving member 32 may define the recess 34, as shown in FIG. 2A. The recess 34 may include an outer rim 52. One or more side walls 54 of the recess 34 may extend from the outer rim 52 to a base wall 56 of the recess 34. The recess 34 may be configured to receive the at least one foot pedal 24. In various embodiments, the recess 34 may be configured to receive the at least one foot pedal 24 when the at least one foot pedal 24 moves from the use position to the stowed position, such that the at least one foot pedal 24 is nested within the recess 34 of the receiving member 32. In various embodiments, at least a portion of the at least one foot pedal 24 may be received within the recess 34. In other words, in various embodiments, the recess 34 may partially, substantially, or majorly receive the at least one foot pedal 24. For example, as shown in FIGS. 3A and 3B, the recess 34 may receive the pad 24A of the brake pedal 28 entirely, while receiving only a portion of the lever feature 24B of the brake pedal 28. In some embodiments, the at least one foot pedal 24 may contact the receiver 32 and/or the recess 34 while in the stowed position. It is contemplated that the recess 34 may include a plurality of recesses 34 defined by the receiving member 32, each configured to receive a foot pedal 24. For example, as depicted in FIGS. 3A and 3B, the receiving member 32 may include two recesses 34 configured to receive the brake pedal 28 and the accelerator pedal 26 while in the stowed positions.

As shown in FIGS. 2B and 3B, the receiving member 32 may be disposed laterally vehicle inboard of a dead pedal 50 disposed within the footwell 20. As depicted, the receiving member 32 may further be disposed vehicle forward of the vehicle rearward surface of the dead pedal 50. It is contemplated that the receiving member 32 may be composed of at least one of a variety of materials that includes, but is not limited to, foam, plastic, metal, rubber, natural materials, fibers, and/or a combination thereof.

In reference to FIGS. 2A-7B, the cover feature 36 may be disposed within the footwell 20. In various embodiments, the cover feature 36 may be coupled to the receiving member 32. In some embodiments, the cover feature 36 may be integrally coupled with the receiving member 32. For example, the cover feature 36 may be integrally coupled to the receiving member 32 via a living hinge 44, as shown in FIGS. 6A and 6B. In some embodiments, the cover feature 36 may be removably coupled to the receiving member 32, as shown in FIGS. 5A and 5B, wherein the cover feature 36 includes a floor mat 38 disposed in the footwell 20. It is contemplated that, in various embodiments, the cover feature 36 may be coupled, integrally coupled or removably coupled from at least one of a variety of components of the footwell 20 (e.g., vehicle floor, dashboard, dead pedal 50, vehicle console, etc.).

Figure 4A:
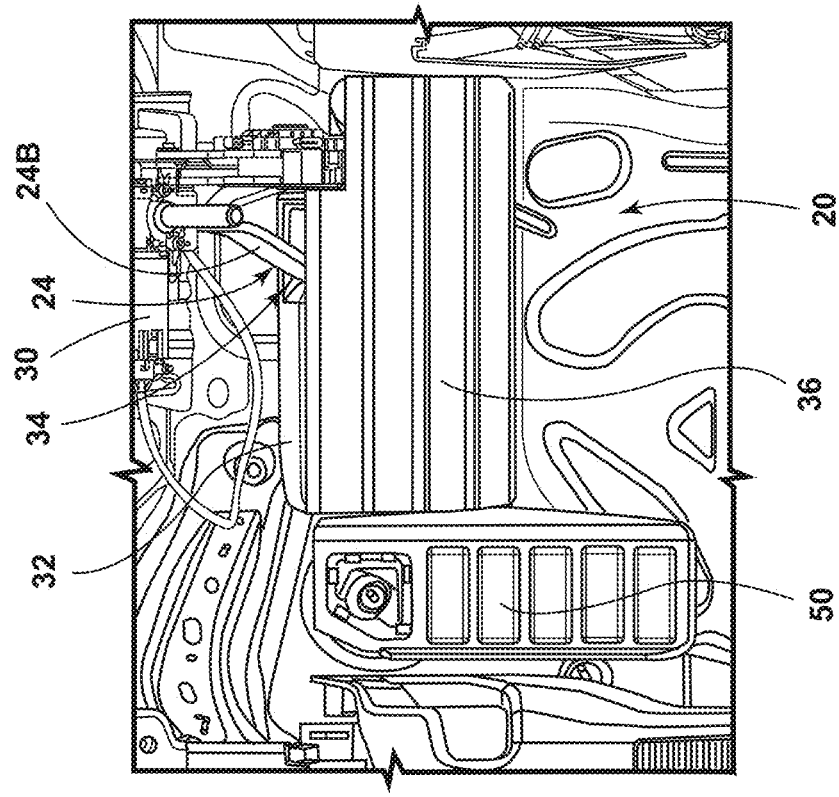
FIG. 4A is a perspective view of the footwell, illustrating the foot pedals in the stowed position and the cover feature in a second concealment position.
Figure 4B:
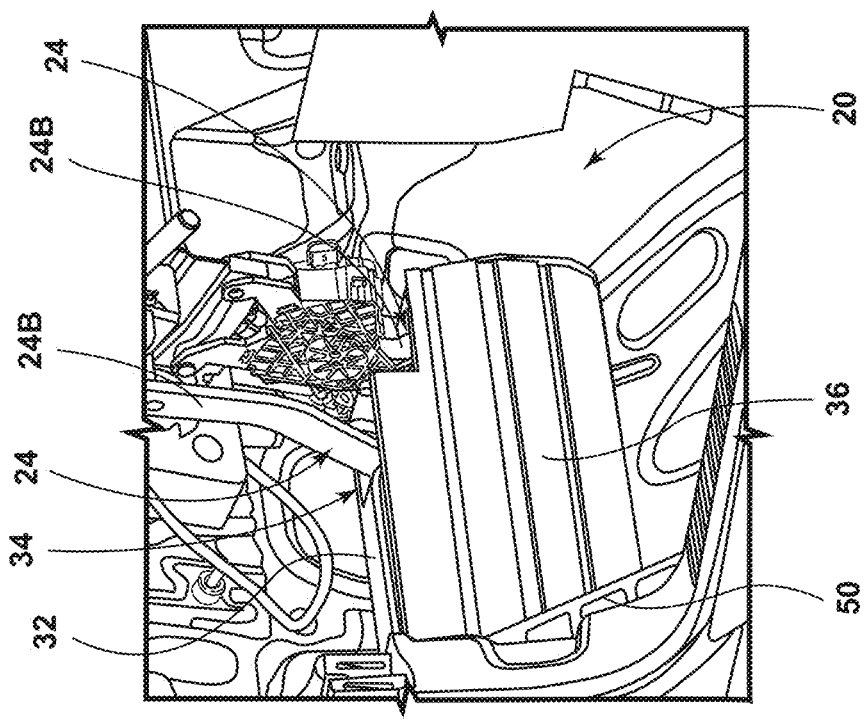
FIG. 4B is a frontal view of the footwell, illustrating the foot pedals in the stowed position and the cover feature in the second concealment position.

In various embodiments, the cover feature 36 may be configured to cover the at least one foot pedal 24 when the at least one foot pedal 24 is in the stowed position. In some embodiments, the cover feature 36 may be configured to cover the at least one foot pedal 24 when the at least one foot pedal 24 is nested within the recess 34 of the receiving member 32 in the stowed position. In some embodiments, the cover feature 36 may be configured to cover the portion of the at least one foot pedal 24 that is positioned within the recess 34. In various embodiments, the cover feature 36 may be operable between a first position and a second concealment position. The cover feature 36 may be configured to cover the at least one foot pedal 24 when the cover feature 36 is in the second concealment position. For example, the cover feature 36 may move from the first position, as shown in FIGS. 3A and 3B, to the second concealment position, as shown in FIGS. 4A and 4B, wherein the cover feature 36 covers the at least one foot pedal 24 that is in the stowed position. In various embodiments, the cover feature 36 may be positioned vehicle rearward of the at least one foot pedal 24 while the at least one foot pedal 24 is in the stowed position and the cover feature 36 is in the second concealment position. Further, in some embodiments, the cover feature 36 may be configured to extend across at least a portion of the recess 34 of the receiving member 32 while the at least one foot pedal 24 is in the stowed position, and the cover feature 36 is in the second concealment position. In various embodiments, the at least one foot pedal 24 may be positioned between the receiving member 32 and the cover feature 36 when the at least one foot pedal 24 is in the stowed position and the cover feature 36 is in the second concealment position. It is contemplated that in some embodiments, the cover feature 36 may be motorized and move between the first position and the second concealment position via actuation of a motor. The movement may be automated in such a way that the controller 60 prompts motorized movement in response to receiving inputs 68, such as a vehicle occupant command or determination that a predetermined condition has been met.

Referring now to FIGS. 3A-4B, in some embodiments, the cover feature 36 may extend from a compacted orientation as the cover feature 36 moves from the first position to the second concealment position. The cover feature 36 may extend to cover the at least one foot pedal 24 in at least one of a variety of manners that includes, but is not limited to, unfurling, unrolling, unfolding, stretching, and/or a combination thereof. For example, in one embodiment, the cover feature 36 may be disposed in a compacted orientation below the receiving member 32 while in the first position, as shown in FIGS. 3A and 3B, and then may unfurl generally vehicle upward to cover the at least one foot pedal 24 as the cover feature 36 moves to the second concealment position shown in FIGS. 4A and 4B. It is contemplated that in some embodiments, the cover feature 36 may be removably coupled to various components of the footwell 20 while in the second concealment position. As such, in some embodiments, the cover feature 36 may be stored in a separate place in the vehicle 10 while in the first position and then may be moved to the second concealment position within the footwell 20 to cover the at least one foot pedal 24.

Figure 5B:
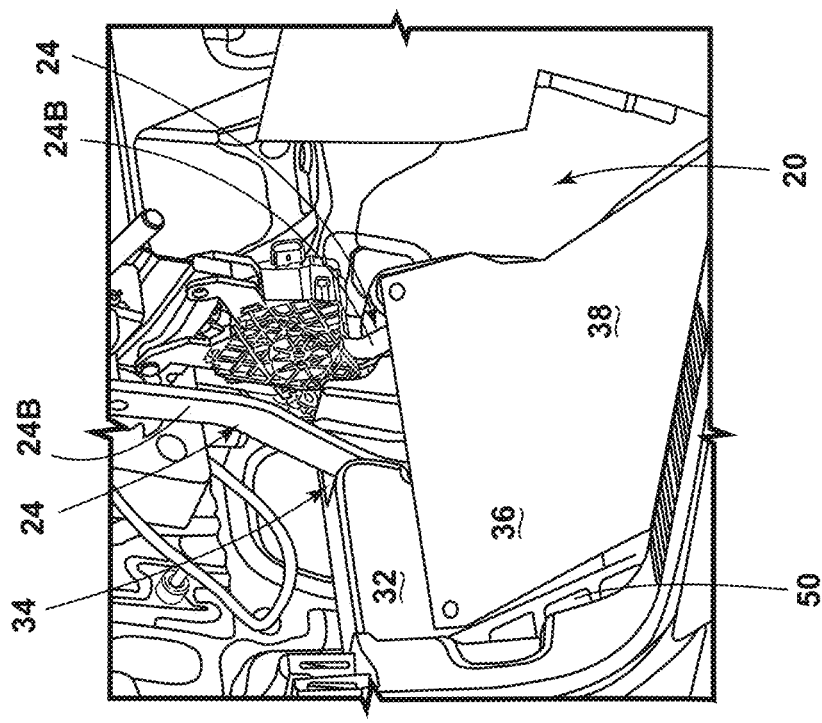
FIG. 5B is a perspective view of the footwell, illustrating the foot pedals disposed within a recess of the receiving member while in the stowed position and the cover feature in the form of the floor mat in a second concealment position.
Figure 5A:
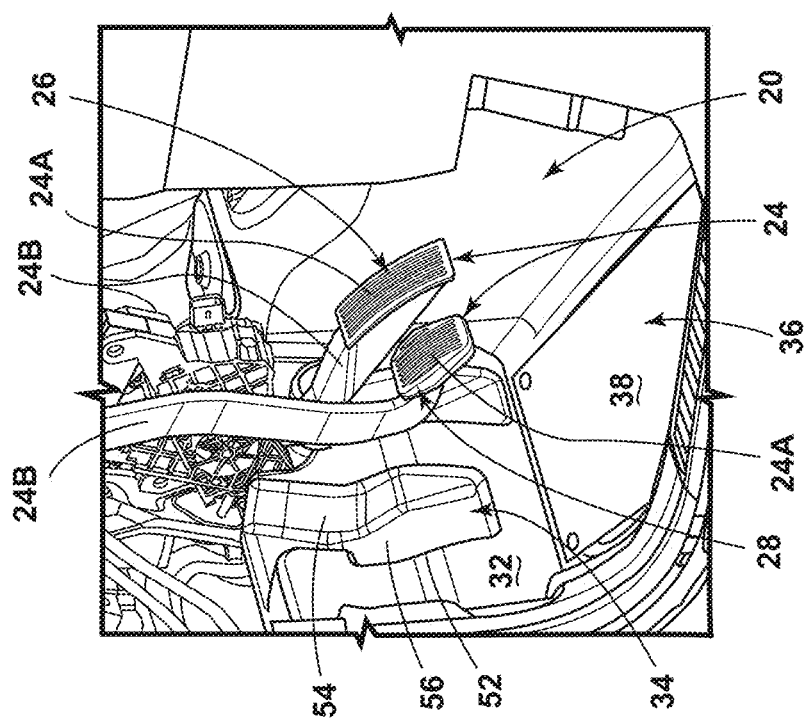
FIG. 5A is a perspective view of the foot pedals disposed within the footwell in a use position, illustrating the cover feature in the form of a floor mat in a first position, according to another embodiment.

Referring now to FIGS. 5A and 5B, in some embodiments, the cover feature 36 may include the floor mat 38. In such embodiments, the floor mat 38 may be operable between the first position, as shown in FIG. 5A, and the second concealment position, as shown in FIG. 5B. While in the first position, the floor mat 38 may be disposed below and/or vehicle rearward of the receiving member 32 as shown in FIG. 5A. It is contemplated that the floor mat 38 may be coupled to a portion of the receiving member 32 while in the first position. In various embodiments, the floor mat 38 may be coupled to the receiving member 32 while in the second concealment position, such that the floor mat 38 covers at least a portion of the at least one foot pedal 24, as shown in FIG. 5B. It is contemplated that the floor mat 38 may be coupled to the receiving member 32 via at least one of a variety of features that includes, but is not limited to, snaps, hooks, hook and loop fasteners, magnets, corresponding male and female attachment components, and/or a combination thereof. Further, it is contemplated that the floor mat 38 may be coupled to other components within the footwell 20 (e.g., dead pedal 50, trim components, dashboard, floor, center console, etc.) instead of or in addition to being coupled to the receiving member 32 while covering the at least one foot pedal 24 in the second concealment position. In operation, in some embodiments, the floor mat 38 may be moved from its position on the floor (first position) by the vehicle occupant to the second concealment position, as shown in FIG. 5B, to cover the at least one foot pedal 24 nested within the recess 34 of the receiving member 32 while in the stowed position.

Referring now to FIGS. 6A and 6B, in various embodiments, the cover feature 36 may include a panel feature 42 configured to cover the at least one foot pedal 24 while the at least one foot pedal 24 is in the stowed position. In some embodiments, the panel feature 42 may be coupled to the receiving member 32. In some embodiments, the panel feature 42 may be pivotally coupled to the receiving member 32. The panel feature 42 may be pivotally coupled to the receiving member 32 via the living hinge 44, as depicted in FIGS. 6A and 6B. In various embodiments, the panel feature 42 may be configured to pivot from the first position to the second concealment position, wherein the panel feature 42 is configured to cover the at least one foot pedal 24 while the at least one foot pedal 24 is in the stowed position. As shown in FIGS. 6A and 6B, in some embodiments, the panel feature 42 may pivot about the living hinge 44 from the first position to the second concealment position. It is contemplated that the panel feature 42 may be coupled to various footwell 20 components in addition to, or instead of, the receiving member 32 and may be configured to pivot from the first position to the second concealment position via that coupling.

Figure 7B:
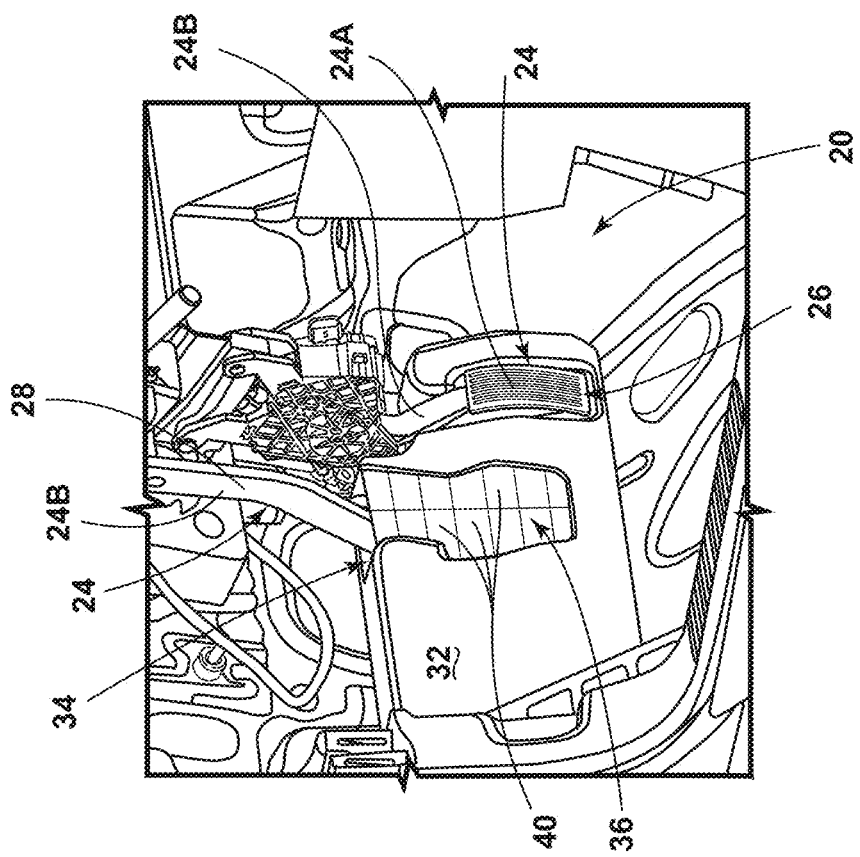
FIG. 7B is a perspective view of the footwell, illustrating the foot pedals in the stowed position and the cover feature in the form of a plurality of finger features coupled to the receiving member proximate to the recess covering one of the stowed foot pedals.
Figure 7A:
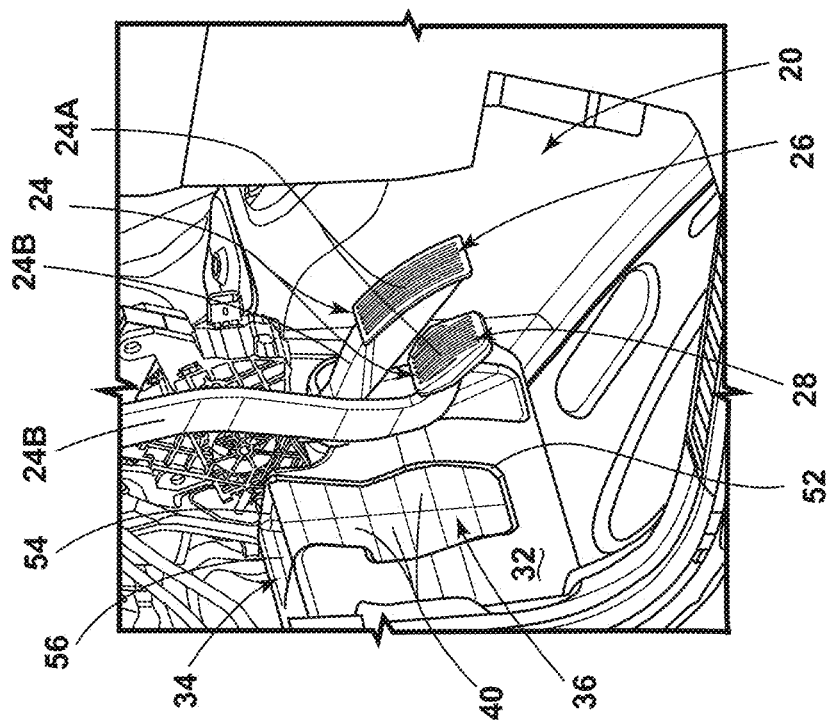
FIG. 7A is a perspective view of the footwell, illustrating the foot pedals in the use position and a cover feature in the form of a plurality of finger features coupled to the receiving member proximate to the recess, according to a further embodiment.

Referring now to FIGS. 7A and 7B, in some embodiments, the cover feature 36 may include a plurality of finger features 40. The plurality of finger features 40 may be coupled to the receiving member 32 proximate to the recess 34. In some embodiments, the plurality of finger features 40 may be configured to yieldingly allow ingress and egress of the at least one foot pedal 24 as the at least one foot pedal 24 moves between the use and stowed positions. Accordingly, as shown in FIG. 7B, the plurality of finger features 40 may be configured to cover at least a portion of the at least one foot pedal 24 while the at least one foot pedal 24 is in the stowed position. In some embodiments, the plurality of finger features 40 may be recess-inward of the outer rim 52 of the recess 34. In other words, the plurality of finger features 40 may be disposed between the outer rim 52 of the recess 34 and the base wall 56 of the recess 34. For example, as shown in FIGS. 7A and 7B, the plurality of finger features 40 may be vehicle forward of the outer rim 52 of the recess 34. It is contemplated that the plurality of finger features 40 may include a variety of features configured to allow ingress and egress of the at least one foot pedal 24. For example, the plurality of finger features 40 may include bristles extending recess-inboard from the one or more side walls 54 of the recess 34. In some embodiments, the plurality of finger features 40 may include a plurality of appendages configured to flex to allow ingress and egress. Such appendages may be composed of at least one of a variety of flexible materials that includes, but is not limited to, plastic, rubber, silicone, natural materials and/or a combination thereof.

Figure 8:
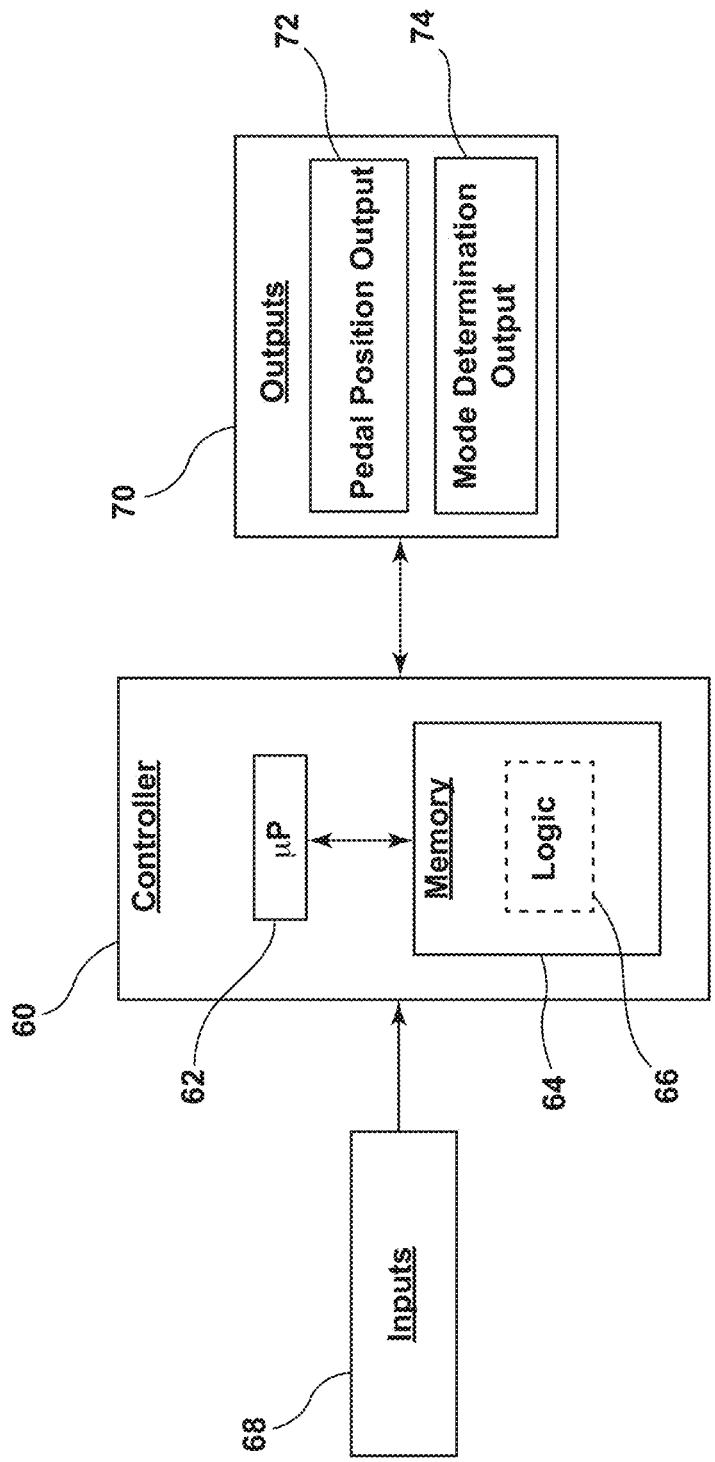
FIG. 8 is a block diagram of vehicle controls, illustrating a controller for controlling the foot pedals, according to one embodiment.

Referring now to FIG. 8, as referenced above, the vehicle 10 may include the controller 60, which may be configured to receive various inputs 68 and generate various output signals to control outputs 70 that may involve the at least one foot pedal 24. The controller 60 may be a shared or dedicated controller that includes a microprocessor 62 and memory 64 as illustrated, according to various embodiments. It should be appreciated that the controller 60 may include control circuitry such as analog and/or digital control circuitry. Stored within the memory 64 and executed by the microprocessor 62 is logic 66 for processing the various inputs 68 and controlling various outputs 70 described herein.

The inputs 68 to the controller 60 may include commands entered into the vehicle 10 by the vehicle occupant. For instance, the controller 60 may receive an input 68 in the form of a signal sent to the controller 60 in response to the vehicle occupant entering a command into a Human-Machine Interface (HMI) of the vehicle 10. In some embodiments, the controller 60 may receive inputs 68 from various data collecting sensors coupled to the vehicle 10. For instance, in some embodiments, the controller 60 may receive an input 68 in the form of a signal sent to the controller 60 by a sensor coupled to the vehicle 10 in response to the sensor sensing that a predetermined condition had been met.

In various embodiments, the controller 60 may control various outputs 70 in response to receiving inputs 68. In some embodiments, the controller 60 may respond to an input 68 by executing a pedal position output 72 that prompts the at least one foot pedal 24 to move from the use position to the stowed position or from the stowed position to the use position. For example, the controller 60 may respond to the vehicle occupant entering a command into the HMI of the vehicle 10 by controlling the pedal position output 72 that causes the motor 30 to move the brake pedal 28 from the use position to the stowed position. In some embodiments, the controller 60 may respond to an input 68 by executing a mode determination output 74 that causes the at least one foot pedal 24 to switch between activated and deactivated modes. For example, the controller 60 may respond to a command to put the vehicle 10 into autonomous mode by controlling the mode determination output 74 that prompts the at least one foot pedal 24 to switch from the activated mode to the deactivated mode. It is contemplated that the controller 60 may receive inputs 68 and control outputs 70 that influence various other vehicle functions and, further, that the controller 60 may be in communication with one or more other vehicle controllers.

In operation, in some embodiments, the vehicle occupant may input a command to the controller 60 that prompts the controller 60 to deactivate the at least one foot pedal 24 and move the at least one foot pedal 24 from the use position to the stowed position. The motor 30 may then move the at least one foot pedal 24 from the use position to the stowed position, such that the at least one foot pedal 24 is nested within the recess 34 within the receiving member 32 disposed at the vehicle forward end of the footwell 20. The user may then move the cover feature 36 from the first position to the second concealment position to cover the stowed at least one foot pedal 24, such that the at least one foot pedal 24 is disposed between the receiving member 32 and the cover feature 36. Further, upon desiring to activate the at least one foot pedal 24, the user may move the cover feature 36 from the second concealment position to the first position, revealing the at least one foot pedal 24, and then input a command to the controller 60 to prompt the motor 30 to move the at least one foot pedal 24 from the stowed position to the use position.

The present disclosure may provide a variety of advantages. First, moving the deactivated at least one foot pedal 24 from the use position to the stowed position may prevent the at least one foot pedal 24 from unnecessarily taking up space in the footwell 20. Second, the recess 34 defined by the receiving member 32 may provide an area for the at least one foot pedal 24 to be stowed while in the stowed position, such that the at least one foot pedal 24 is not inconveniently protruding into the footwell 20. Third, the cover feature 36 may give an aesthetically streamlined appearance to the footwell 20 when the at least one foot pedal 24 is in the stowed position and the cover feature 36 is in the second concealment position. Additionally, the cover feature 36 may reduce potential confusion for the vehicle occupant as to whether the at least one foot pedal 24 is in an activated mode or a deactivated mode when the at least one foot pedal 24 is in a deactivated mode and in the stowed position while the cover feature 36 is in the second concealment position covering the at least one foot pedal 24.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A footwell assembly for a vehicle, comprising:
   at least one foot pedal disposed in the footwell and operable between a use position and a stowed position;
   a receiving member positioned within the footwell and defining a recess, wherein the at least one foot pedal is configured to nest within the recess while in the stowed position; and
   a cover feature positioned within the footwell and configured to cover the at least one foot pedal when the at least one foot pedal is nested within the recess of the receiving member in the stowed position.

2. The footwell assembly of claim 1, wherein the cover feature comprises:
   a floor mat disposed in the footwell and configured to extend to cover the at least one foot pedal in the stowed position.

3. The footwell assembly of claim 1, wherein the cover feature comprises:
   a plurality of finger features coupled to the receiving member proximate to the recess and configured to yieldingly allow the at least one foot pedal to ingress and egress the recess as the at least one foot pedal moves between the use and stowed positions.

4. The footwell assembly of claim 1, wherein the cover feature comprises:
   a panel feature disposed within the footwell and operable between a first position and a second concealment position, wherein the panel feature is configured to cover the at least one foot pedal in the stowed position.

5. The footwell assembly of claim 4, wherein the panel feature is coupled to the receiving member and configured to pivot from the first position to the second concealment position.

6. The footwell assembly of claim 5, wherein the panel feature comprises:
   a living hinge about which the panel feature is configured to pivot.

7. The footwell assembly of claim 1, wherein the at least one foot pedal comprises:
   an accelerator pedal.

8. The footwell assembly of claim 1, wherein cover feature is operably coupled to the receiving member.

9. The footwell assembly of claim 1, wherein the at least one foot pedal is deactivated while in the stowed position.

10. The footwell assembly of claim 1, wherein the cover feature is configured to cover the at least one foot pedal by moving from a first position to a second concealment position, wherein the cover feature is coupled to the receiving member and extends across at least a portion of the recess while the at least one foot pedal is in the stowed position.

11. A system for stowing foot pedals in a footwell of a vehicle, comprising:
    at least one foot pedal disposed in the footwell of the vehicle and operable between a use position and a stowed position vehicle forward of the use position;
    a receiving member disposed vehicle forward of the at least one foot pedal; and
    a cover feature operable to enter a concealment position when the at least one foot pedal is in the stowed position, wherein the cover feature is coupled to the receiving member, the at least one foot pedal is disposed between the receiving member and the cover feature, and the cover feature is positioned vehicle rearward of the at least one foot pedal.

12. The system of claim 11, wherein the at least one foot pedal comprises:
    an accelerator pedal.

13. The system of claim 12, wherein the at least one foot pedal further comprises:
    a brake pedal.

14. The system of claim 12, wherein the accelerator pedal is deactivated while in the stowed position.

15. The system of claim 11, wherein the receiving member defines a recess configured to receive the at least one foot pedal as the at least one foot pedal moves from the use position to the stowed position.

16. A vehicle, comprising:
    a footwell;
    an accelerator pedal positioned within the footwell and operable between a use position, and a stowed position;
    a receiving member positioned within the footwell and defining a recess configured to receive the accelerator pedal when the accelerator pedal is in the stowed position; and
    a cover feature coupled to the receiving member and configured to cover the accelerator pedal when the accelerator pedal is in the stowed position and within the recess defined by the receiving member, wherein the cover feature is positioned between the stowed position and the use position of the accelerator pedal.

17. The vehicle of claim 16, wherein the accelerator pedal is deactivated while in the stowed position.

18. The vehicle of claim 16, wherein the use position of the accelerator pedal is vehicle rearward of the stowed position.

19. The vehicle of claim 16, wherein the receiving member is positioned vehicle forward of the accelerator pedal when the accelerator pedal is in the use position and when the accelerator pedal is in the stowed position.

20. The vehicle of claim 16, further comprising:
    a motor operable to move the accelerator pedal between the use position and the stowed position.

* * * * *